(No Model.) 3 Sheets—Sheet 2.
J. W. ANDERSON.
DAMPER.
No. 517,993. Patented Apr. 10, 1894.
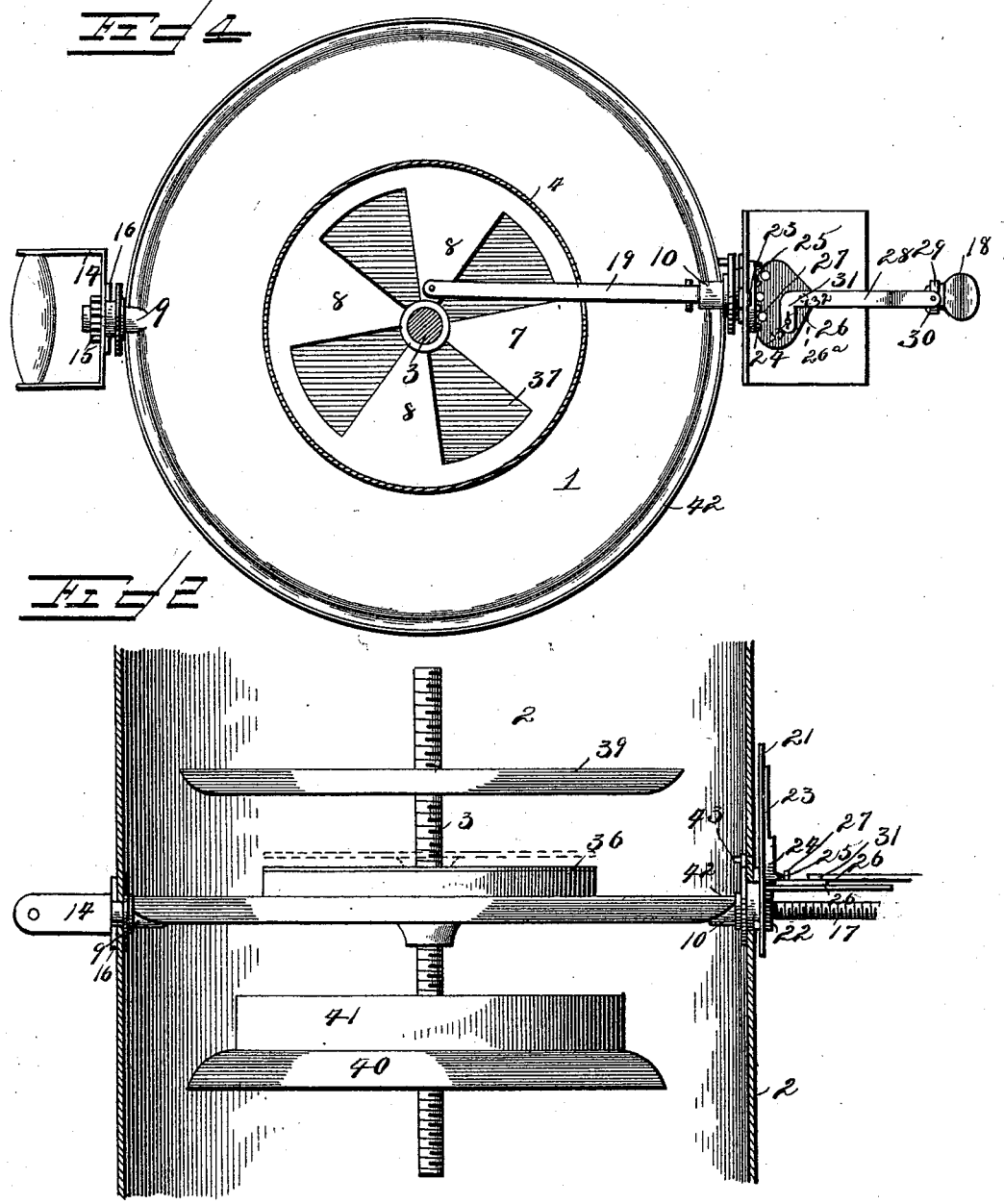
Witnesses
W. E. Schneider
Inventor
John W. Anderson
By his Attorneys.
C. A. Snow & Co.
THE NATIONAL LITHOGRAPHING COMPANY,
WASHINGTON, D. C.

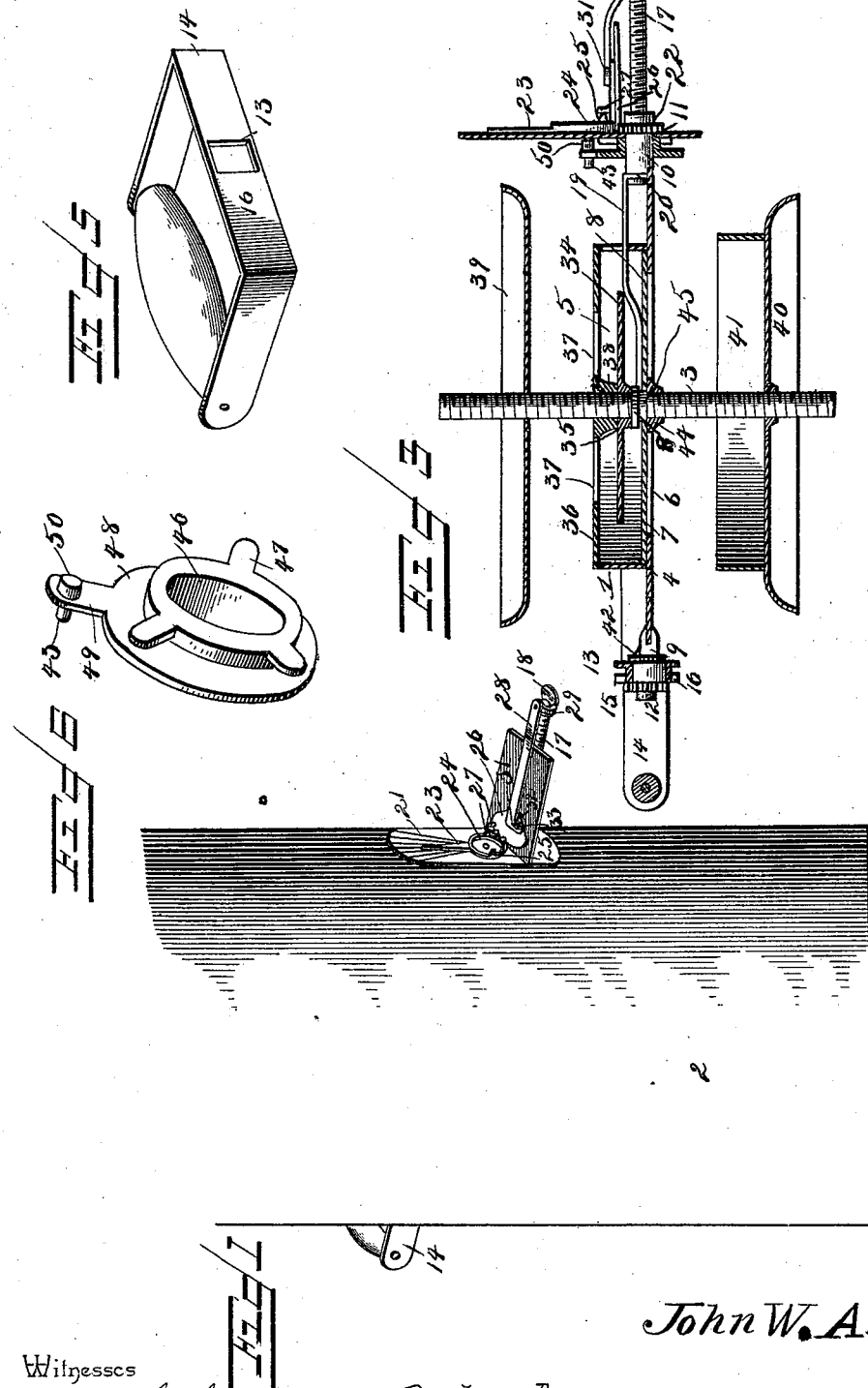

(No Model.) 3 Sheets—Sheet 3.
J. W. ANDERSON.
DAMPER.
No. 517,993. Patented Apr. 10, 1894.
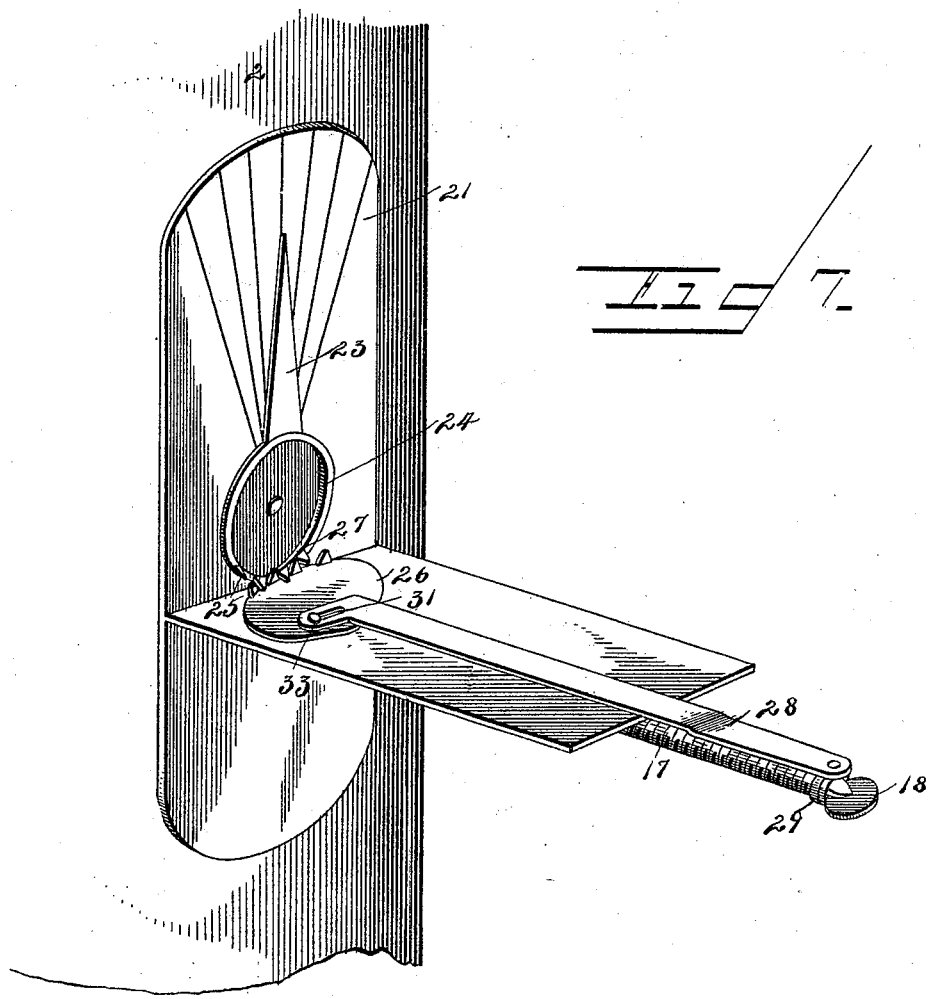
Witnesses
W. E. Schneider.
Inventor
John W Anderson
By his Attorneys.
C A Snow & Co.

UNITED STATES PATENT OFFICE.

JOHN W. ANDERSON, OF LANCASTER, PENNSYLVANIA, ASSIGNOR TO OLIVER N. ANDERSON, OF SAME PLACE.

DAMPER.

SPECIFICATION forming part of Letters Patent No. 517,993, dated April 10, 1894.

Application filed May 31, 1893. Serial No. 476,116. (No model.)

*To all whom it may concern:*

Be it known that I, JOHN W. ANDERSON, a citizen of the United States, residing at Lancaster, in the county of Lancaster and State of Pennsylvania, have invented a new and useful Damper, of which the following is a specification.

My invention relates to improvements in draft-regulating dampers, and it contemplates the provision of adjustable draft-regulating devices under the control of the operator and indicating devices to show the state of adjustment of such part.

Further objects and advantages of my invention will appear in the following description, and the novel features thereof will be particularly pointed out in the appended claims.

In the drawings: Figure 1 is a side view of a pipe or flue, showing the indicating devices which are arranged upon the exterior thereof. Fig. 2 is a sectional view of the pipe or flue, showing the damper mechanism in side elevation. Fig. 3 is a central vertical section of the damper mechanism. Fig. 4 is a sectional plan view to show the means for operating the register or valve. Fig. 5 is a detail view in perspective of the handle detached. Fig. 6 is a similar view of the bushing which is arranged in the opening of the pipe or flue. Fig. 7 is a view of the dial, index, and actuating mechanism, on an enlarged scale.

Similar numerals of reference indicate corresponding parts in all the figures of the drawings.

In carrying out my invention I employ a main plate 1, which, in plan, corresponds with the shape of the section of the pipe or flue 2, in which it is arranged, such plate being provided with a central perpendicularly-disposed or axial stem 3, which extends above and below the main plate and is threaded throughout its length. Fixed to the upper side of the plate 1, and concentric therewith, is a collar 4, inclosing a space 5, which I will for convenience term a deflecting chamber. The bottom of this chamber, which is formed by the plate 1, is perforated or cut away at intervals, as shown at 6, and rotatably mounted upon the stem is a register or valve-plate 7, which is held in contact with the surface of the floor of the deflecting chamber by means of a rib 8, carried by the stem.

The plate 1 is provided at diametrically-opposite points with trunnions 9 and 10, which are mounted in suitable bearings 11 in the sides of the flue or pipe and extend beyond the outer surface thereof. The trunnion 9 is squared or flattened upon opposite sides, as shown at 12, to fit in the correspondingly-shaped opening 13 of the operating handle 14, the latter being secured upon the trunnion by means of a thumb-nut 15, which acts in the capacity of a tension screw by holding the inner bar 16 of the handle in frictional contact with the surface of the pipe or flue. The opposite trunnion 10 is hollow or tubular, as shown, the bore thereof being tapped to receive the threaded operating spindle 17, provided with a suitable handle 18. Loosely connected to the inner end of the operating spindle is a push-bar or link 19, pivoted to the rotary register or valve-plate at one side of its bearing, whereby as the operating spindle is revolved, and hence moved inwardly or outwardly in a direction corresponding with a radius of the pipe or flue, the register or valve is opened or closed. The connection between the link and the operating spindle consists of an eye 20, carried by the link and engaging a reduced portion or neck of the spindle.

The indicating device comprises, essentially, a dial 21, which is fixed to the hollow or tubular trunnion 10, being held in place by means of a thumb-nut 22, an index traveling over said dial and connections between the index and the operating spindle, whereby motion is communicated from the latter to the former, as the register or valve is adjusted. The index finger 23 is pivotally connected to the dial plate and is provided with a head 24, having perpendicularly-disposed spurs 25.

26 represents a segment plate having vertical spurs 27 to engage the spurs of the index finger; and 28 represents a link which is provided at its outer end with a ring 29 fitting upon a reduced portion or neck 30 near the outer extremity of the operating spindle, and is provided at its inner end with an offset 31, provided with a slot 32, in which fits a headed pin 33, carried by the segment.

It will be understood that as the operating spindle moves longitudinally to adjust the register or valve, the swinging movement, which is imparted to the segment through the connecting link, will be communicated to and actuate the index to indicate by means of a suitable scale thereon the position or amount of opening of the register or valve.

The segment 26 is pivoted at the point 26ª, concentric with the toothed edge of the segment, and hence the longitudinal movement of the link 28, caused by the operating screw 17, causes a partial rotary movement of the segment.

34 represents a disk which is threaded upon the portion of the stem above the plane of the main plate 1, and is of less diameter than the deflecting space or chamber, and hence is adapted to fit thereinto with its periphery out of contact with the walls of the same, a shoulder being arranged upon the under surface of the disk, as shown at 35, to prevent contact between the disk and the register or valve-plate and hold the same at such an interval as to permit the valve-operating link to operate freely. Above the disk 34 and threaded upon the stem 3, is a deflecting plate 36, the diameter of which is such as to enable it, when arranged in the position shown in Fig. 3, to bear upon the upper edge of the up-standing collar 4. This plate is provided adjacent to the stem with perforations or openings 37. Thus an annular opening or space is formed between the periphery of the disk 34 and the walls of the deflecting chamber, and central perforations or openings are formed in the plate 36, which is adapted when so arranged to form the roof of the deflecting chamber. Said plate is provided upon its under side with a depending shoulder 38 to prevent contact between its under surface and the disk 34. Threaded upon the upper portion of the stem above the plate 36, is a deflecting plate 39, and threaded upon the stem below the main plate 1 is a twin deflecting plate 40, provided upon its upper side with an up-standing annular collar 41, which is adapted to be arranged at its upper edge adjacent to the under surface of the main plate, the diameter of such collar being sufficiently greater than the collar which forms the deflecting chamber to inclose or lie outside of the openings which are formed in the floor of said deflecting chamber.

In applying the damper to a flue or pipe it frequently occurs that the diameter of the latter varies slightly from that of the main plate and that the intervals between the peripheries of the upper and lower twin deflecting disks and the walls of the flue or pipe are greater than required, and hence in order to permit of adapting these parts to the size of the flue or pipe I preferably flare or flange the edges thereof, as shown at 42. Thus the main plate and the twin disks may be expanded to the desired extent by tapping the flared edges or flanges to produce the necessary relative sizes of the parts. This being the construction of the improved apparatus, the operation thereof is as follows:

The entire damper is capable of a quarter-revolution communicated thereto by means of the handle which is fixed to the trunnion 9, and limited by stop-pin 43, which is located within the pipe or flue. When the main plate is arranged transversely in the pipe the register or valve may be opened or closed to a greater or less extent by the manipulation of the operating spindle, the indicating device showing the extent of such opening.

If the draft afforded by the pipe or flue is slight and it is necessary to increase the same to make it effective when the register or valve is employed as a means of controlling the same, the deflecting plate which is employed to close the top of the deflecting chamber may be elevated to form an annular space between the upper edge of the collar which constitutes the wall of said chamber, and the under surface of said plate, thus allowing the draft to pass from the deflecting chamber directly into the open space above the main plate instead of returning over the upper side of the imperforate disk which is located within the chamber and ascending through the openings or perforations in the roof of the chamber. To further increase the freedom of the draft the imperforate disk 34 may be elevated to provide a greater space between the floor of the deflecting chamber and the under surface of said disk. Furthermore, the twin disks 39 and 40 may be separated a greater distance from the plane of the main plate.

When the draft afforded by the flue or pipe is greater when the damper is in a transverse position than is required, the disk 34 may be depressed to reduce the interval between its under side and the floor of the deflecting chamber, the deflecting plate 36 may be depressed until it contacts with the upper edge of the wall of said chamber, and if necessary the twin upper and lower disks may be brought close to the plane of the main plate to reduce the extent of the passages between the surfaces of contiguous parts. It will be noted that the up-standing collar which is carried by the lower disk 40 may be brought close to the under surface of the main plate to form as narrow a passage as may be required for the purpose of giving the register or valve the desired control of the draft.

All of the co-acting plates and disks constituting the body portion of my improved damper are carried by a common threaded stem, as described, thus simplifying the construction and facilitating the separation and assembling of the parts.

In the accompanying drawings, I have illustrated a preferred form of damper proper and of mechanism for operating the register or valve and indicating the position thereof, but I desire it to be understood that various changes in the form, proportion, and minor details of construction may be resorted to without departing from the spirit or sacrificing the advantages of the invention.

Reference to Fig. 3 of the drawings will show that the main plate 2 is provided with a hub 44, having a tapped bore to receive the threaded stem 3, and that the latter is provided with a shoulder 45 to bear upon the upper surface of the main plate to hold the rib 4 at such an interval from the plane of the plate as to form a bearing for the register or valve 8. Furthermore, I have provided a bushing, which is shown in detail in Fig. 6, to be arranged in the openings in opposite sides of the pipe or flue. This bushing, designated as 46 in the drawings, is provided with lugs or points 47, adapted to pass through correspondingly-shaped notches in the edges of the openings in the pipe or flue, and a flange 48, which is parallel with the plane of the lugs or points 47, and is adapted to bear against the inner surface of the pipe or flue. In placing the bushing, the lugs or points 47 are inserted through the notches in the edges of the openings of the pipe or flue, and when they reach the plane of the outer surface of the pipe or flue the bushing is turned sufficiently to throw the lugs or points out of alignment with the notches. The flange 48 carries an ear 49, also adapted to bear against the inner surface of the pipe or flue and provided with a head 50, to fit in a perforation of the pipe or flue and adapted to be spread or swaged to maintain the bushing in position. The stop-pin 43 is carried by the ear 49, opposite the head 50, and is thus in a position to stop the rotary movement of the damper either in a horizontal or a vertical position.

Having described my invention, what I claim is—

1. In a damper, a revoluble plate provided with an expansible flared or flanged periphery, substantially as specified.

2. In a damper, the combination of a main plate carrying an axially-disposed stem, and upper and lower twin disks adjustably mounted upon said stem and of less diameter than the main plate, said plate and disks being provided with expansible flared or flanged peripheries substantially as specified.

3. In a damper, the combination of a main fulcrumed plate, a register or valve carried thereby, means to operate said register or valve, and upper and lower twin disks arranged parallel with and upon opposite sides of the plane of the main plate and carried thereby, said plates being oppositely flared at their peripheries substantially as specified.

4. In a damper, the combination with a main plate, constructed to form a deflecting chamber and provided with a perforated floor, and cover of a register or valve located within the deflecting chamber to control the openings in the floor thereof, and means to operate said register or valve, substantially as specified.

5. In a damper, the combination with a main fulcrumed plate, constructed to form a deflecting chamber provided with a perforated floor, of an adjustable deflecting plate arranged to close the top of said chamber and provided with outlet openings or perforations, a register or valve arranged within the deflecting chamber to control the openings in the floor thereof, and means to operate the register or valve, substantially as specified.

6. In a damper, the combination with a fulcrumed main plate, constructed to form a deflecting chamber, of a perforated adjustable deflecting plate adapted to close the top of said chamber, a register or valve arranged within the chamber to control openings in the floor thereof, means to operate said register or valve, and a vertically-adjustable disk disposed within the chamber and of less diameter than the same to form an annular space between its periphery and the walls of the chamber, substantially as specified.

7. In a damper, the combination with a main fulcrumed plate and a threaded axial stem carried thereby, of a register or valve mounted centrally upon the plate to control openings therein, means to operate said register or valve, and upper and lower twin disks adjustably mounted upon said stem, the lower disk being provided with an up-standing annular collar, substantially as specified.

8. In a damper, the combination with a main fulcrumed plate, and an axial stem carried thereby, of a rotary register or valve mounted centrally upon the plate to control openings formed therein, means to operate said register or valve, and a disk adjustably fitted upon the stem beneath the main plate and provided with an upstanding annular collar of greater diameter than the space in which the openings in the main plate are formed, substantially as specified.

9. In a damper, the combination with a fulcrumed plate provided with openings or perforations, and a rotary register or valve mounted upon the plate to control said openings or perforations, of an operating spindle threaded in a hollow trunnion of the fulcrumed plate, and a link connecting said spindle to the register or valve, substantially as specified.

10. In a damper, the combination with a fulcrumed plate provided with openings, and a register or valve carried by the plate to control said openings and provided with exteriorly-accessible operating devices, and an indicating mechanism operatively connected to the register or valve, substantially as specified.

11. In a damper, the combination with a perforated fulcrumed plate, and a register or valve carried by the plate to control the openings or perforations therein, of an operating spindle threaded in a hollow or tubular trunnion of the plate and connected to said register or valve, an exposed indicating device, and connections between the indicating device and the operating spindle, substantially as specified.

12. In a damper, the combination with a perforated fulcrumed plate, and a register or valve carried by the plate to control the perforations therein, of an operating spindle connected to said register or valve and threaded in a hollow trunnion of the plate, an index arranged to travel over a suitable dial plate, a segment geared to the index, and a link connecting said segment to the operating spindle, substantially as specified.

13. In a damper, the combination with a perforated plate, and a register or damper carried thereby, of a longitudinally-movable operating spindle, a pivoted index, a toothed segment meshing with spurs upon the index, and a reciprocating link pivotally connected to the segment and having a ring engaging a neck of said spindle, substantially as specified.

In testimony that I claim the foregoing as my own I have hereto affixed my signature in the presence of two witnesses.

JOHN W. ANDERSON.

Witnesses:
J. H. SIGGERS,
C. E. DOYLE.